United States Patent
Kuperman et al.

(10) Patent No.: US 10,623,376 B2
(45) Date of Patent: Apr. 14, 2020

(54) QUALIFYING CLIENT BEHAVIOR TO MITIGATE ATTACKS ON A HOST

(71) Applicant: Zenedge, Inc., Los Angeles, CA (US)

(72) Inventors: Leon Kuperman, Tarzana, CA (US); Fausto Lendeborg, Miami, FL (US); David Allen McKinney, Port Saint Lucie, FL (US); Jose Enrique Hernandez, Santa Monica, CA (US)

(73) Assignee: ZENEDGE, INC., Aventura, FL (US)

( * ) Notice: Subject to any disclaimer, the term of this patent is extended or adjusted under 35 U.S.C. 154(b) by 239 days.

(21) Appl. No.: 15/418,518

(22) Filed: Jan. 27, 2017

(65) Prior Publication Data

US 2017/0222979 A1    Aug. 3, 2017

Related U.S. Application Data

(60) Provisional application No. 62/289,182, filed on Jan. 29, 2016, provisional application No. 62/289,183, filed on Jan. 29, 2016.

(51) Int. Cl.
*H04L 29/06* (2006.01)

(52) U.S. Cl.
CPC ...... *H04L 63/0281* (2013.01); *H04L 63/1416* (2013.01); *H04L 63/1425* (2013.01); *H04L 63/1458* (2013.01); *H04L 63/1466* (2013.01); *H04L 2463/144* (2013.01)

(58) Field of Classification Search
CPC ...... G06F 21/6218; G06F 21/53; G06F 21/31; G06F 21/83; G06F 2221/2105; H04L 63/1466; H04L 63/1416; H04L 63/1425; H04L 63/0281; H04L 63/1458; H04L 2463/144

USPC ......................................................... 726/12
See application file for complete search history.

(56) References Cited

U.S. PATENT DOCUMENTS

| | | | |
|---|---|---|---|
| 7,506,047 B2 * | 3/2009 | Wiles, Jr. ............ | G06F 11/3414 709/224 |
| 8,856,924 B2 | 10/2014 | Holloway et al. | |
| 9,473,530 B2 | 10/2016 | Bhogavilli et al. | |
| 9,641,549 B2 | 5/2017 | Holloway et al. | |
| 9,742,799 B2 | 8/2017 | Bhogavilli et al. | |
| 2013/0145428 A1 * | 6/2013 | Holmes .................. | H04L 63/08 726/4 |

(Continued)

*Primary Examiner* — Alexander Lagor
*Assistant Examiner* — Sanchit K Sarker
(74) *Attorney, Agent, or Firm* — Kraguljac Law Group, LLC

(57) ABSTRACT

A system (and method, and computer readable storage medium storing computer program instructions) is configured to determine a fingerprint of a client and qualify client behavior. For example, a proxy positioned between a host and the client may determine the fingerprint of the client and qualify the behavior of clients engaging the host. The client fingerprint provides a relatively stable representation of the client such that the client may be distinguished from the other clients engaging the host and the behavior of the client tracked. Clients engaging the host in a positive manner are prequalified to access the host based on the positive behavior they exhibit. During an attack on the host, such as a DDoS attack, prequalified clients retain access to features and functionality provided by the host to maintain legitimate user experience and better enable the proxy to handle malicious clients.

18 Claims, 8 Drawing Sheets

(56) References Cited

U.S. PATENT DOCUMENTS

| | | | |
|---|---|---|---|
| 2016/0197945 A1* | 7/2016 | Call | G06F 11/3065 726/23 |
| 2017/0034209 A1* | 2/2017 | Bhogavilli | H04L 63/0236 |
| 2017/0063923 A1* | 3/2017 | Yang | H04L 63/1483 |

* cited by examiner

QUALIFYING CLIENT BEHAVIOR TO MITIGATE ATTACKS ON A HOST

CROSS REFERENCE TO RELATED APPLICATIONS

This application claims the benefit of U.S. Provisional Application No. 62/289,182, filed Jan. 29, 2016, and U.S. Provisional Application No. 62/289,183, filed Jan. 29, 2016, both of which are incorporated by reference herein in their entirety.

TECHNICAL FIELD

The disclosure generally relates to improving user experience when accessing a host via a client, and more specifically, to prequalifying client access to the host such that during a distributed denial of service (DDoS) attack on the host legitimate user access is not denied.

BACKGROUND

Internet enabled clients, such as smart phones, personal computers, tablets, gaming systems and the like have become prevalent in recent years. Given the proliferation of Internet enabled clients and far-reaching Internet access, more and more users access online content hosted by servers. The vast majority of users access online content from hosts for legitimate reasons. However, there are illegitimate users who try to take down the hosts of online content with malicious clients, whether to simply deny services to other users or for more nefarious purposes. In many instances, the illegitimate users infect the non-malicious clients of other users with malware such that an increasing number of malicious clients engage in illegitimate activities from disparate locations.

One method of attacking a host is a Distributed Denial of Service (DDoS) attack. A commonly employed type of DDoS attack is an application layer DDoS attack. This is a dangerous DDoS attack type targeting the application layer (layer 7) of a host in the Open Systems Interconnection (OSI) model. An example application layer DDoS attack may maliciously over-exercise functions or features at the application layer of a host with the intention to disable those functions or features. The malicious over-exercising of functions or features of the host decreases the amount of processing resources the host can make available for legitimate user activities. Over time this causes all processing to grind to a virtual halt. By way of example, if a host receives, on average, 100 requests per second and can handle a maximum of 1,000 requests per second, a DDoS attack generating 10,000+ malicious requests per second prevents host processing resources from effectively addressing those requests due to overwhelming demand. Example host computing resources that effectively are drained causing processing activity to grind to towards a halt during an application layer DDoS attack. Hosting computing resources affected may include, for example, compute resources for dynamically generated web content, database resources, search index resources, ecommerce components, and/or application programming interface (API) endpoints.

Current techniques for mitigating the effects of DDoS attacks on legitimate user access to the host generate a high number of false positives as they attempt to distinguish between malicious and non-malicious clients at the time of attack. False positives are instances where a non-malicious client is falsely categorized or identified as a malicious client. As an example, under some current techniques, all clients attempting to access a particular feature of the host that is under attack may be categorized as malicious (e.g., denied access to the host) during the attack period. While this technique potentially prevents clients accessing other features of the host from being affected by the attack, malicious and non-malicious clients alike are denied access to attacked features during the attack period. As a result, selectively attacking features of the host such as a checkout feature of an ecommerce site can effectively shut down legitimate user progress through the site. In turn, this causes numerous negative effects, including, for example, negatively impacting user experiences such as response times, reducing commercial transactions through the ecommerce site, and/or discouraging future site access due to negative publicity.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

DETAILED DESCRIPTION

Figure 1:
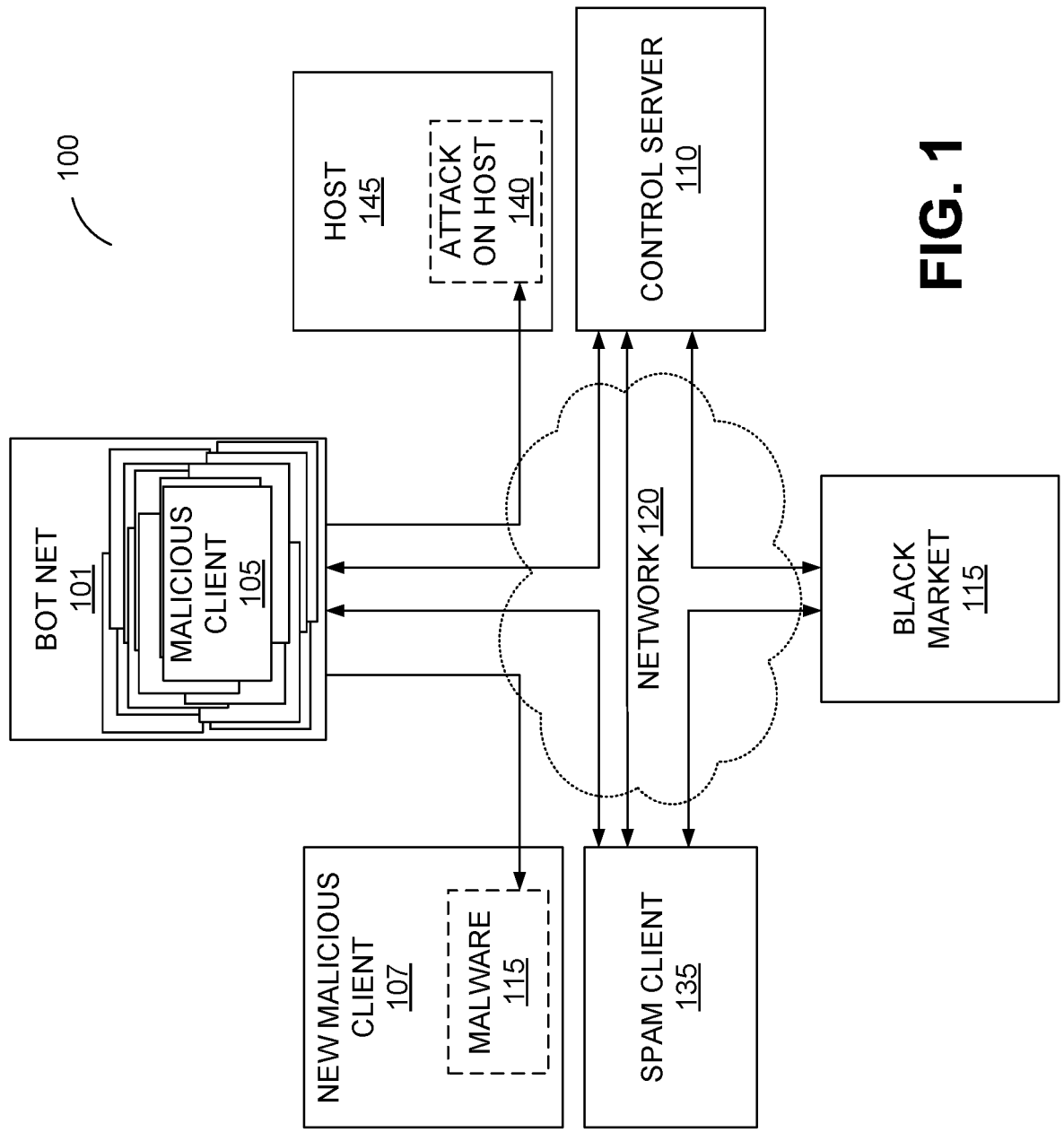
FIG. 1 illustrates a block diagram of an example communications environment of an attack on a host, according to one example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A system (and method, and computer readable storage medium storing computer program instructions) may be configured for qualifying client device (or client) behavior to mitigate the effects of an attack on a host device (or host). An example of an attack may be an application layer (layer 7) DDoS attack. Example embodiments described herein include a proxy, such as a Hypertext Transfer Protocol (HTTP)/HTTPS over Secure Socket Layer/HTTPS) (or HTTP(S)) proxy server, configured to handle network traffic between at least one host and one or more clients. Clients engage the host through the proxy to access application layer features and functionality of the host. As clients engage the host, the proxy determines an identity of each of the clients engaging the host, referred to herein as a client fingerprint. The client fingerprint provides a relatively stable representation of a client such that the client may be distinguished from other clients engaging the host.

The proxy continuously monitors behavior of clients engaging a host and qualifies the clients based on their behavior. For example, the proxy may prequalify clients exhibiting positive user behavior and deny clients exhibiting negative user behavior. Prequalified clients are permitted access to one or more features and/or functionality of the host while denied clients are denied access to the features and/or functionality of the host. The proxy maintains a store of "fingerprints" corresponding to the prequalified clients and a store of fingerprints corresponding to the denied clients.

In one embodiment, the proxy may be configured to continuously monitor the behavior of the clients engaging the host during non-attack periods. Monitoring by the proxy may allow to build the store of client fingerprints corresponding to the prequalified clients in order to provide the prequalified clients, and thus a significant portion of known legitimate users, access to one or more features and functionality of the host during an attack period. Accordingly, the proxy may permit prequalified clients access to one or more features and functionality of the host targeted by an attack (e.g., DDoS attack) during the attack period with zero to minimal intrusion on legitimate user experience. In some embodiments, the proxy may incorporate the functionality of the host or vice versa. In one example embodiment, the proxy is incorporated at the host and logically processes traffic (e.g., as a pre-processing filter) prior to traffic being processed by the host.

The proxy may utilize information within the store of client fingerprints corresponding to the denied clients to deny access to the features and functionality of the host during non-attack and attack periods. However, because periods of attacks are often characterized by an abnormal level of new client engagement with the host, the store of denied client fingerprints may not capture the majority of malicious clients prior to an attack (in contrast to the prequalified client store which captures a significant portion of non-malicious clients that routinely engage the host). Accordingly, the proxy may deny non-prequalified clients access to the features and functionality of the host. Recognizing that an attack may target one or a small number of features and functionality of the host and non-malicious clients may utilize other features and functionality, in some embodiments the proxy denies non-prequalified clients access to the one or more features and functionality of the host under attack while permitting access to the one or more other features and functionality not under attack. Additionally, recognizing that non-malicious (but not prequalified) clients may engage the host during an attack period, in some embodiments the proxy may employ one or more mitigation techniques to non-prequalified (but not yet denied) clients during an attack period. This configuration may help maintain additional legitimate user access to the one or more features and functionality under attack.

Many mitigation techniques come at the cost of an increased level of intrusion on legitimate user experience. In order to minimize the level of intrusion, in some embodiments the proxy gradually prequalifies clients to higher tiers of service provided by the host based on the client behavior and/or response to one or more mitigation techniques. In some example embodiments, mitigation techniques are selectively applied according to the tier of service requested by the client. For example, the proxy may apply a mitigation technique to a prequalified client attempting to engage a higher tier of service than their current prequalification and/or non-prequalified clients attempting to engage the host. In some example embodiments, the proxy may employ less or more stringent mitigation techniques depending on client prequalification, tier of service being engaged, whether the host is under attack, and/or whether the specific feature or functionality being engaged is under attack.

In some example embodiments, the system (and method, and computer readable storage medium storing computer program instructions) includes one or more routers upstream of the proxy. An upstream router routes traffic between one or more clients and the proxy. Multiple upstream routers may be positioned between the proxy and a client. For example, the most upstream router may be closest to the client and the least upstream router may be positioned closest to the proxy, with any number of intervening routers. In some example embodiments, the proxy may provide client fingerprint information in the denied client store to an upstream router. In turn, the upstream router may block client requests destined for the host prior to their receipt at the proxy. In some example embodiments, the proxy may identify a most upstream router accessed by a denied client for providing client fingerprint information corresponding to the denied. This may decrease an amount of illegitimate traffic on one or more networks.

DDoS Attacks

Turning now to Figure (FIG. 1, it illustrates a block diagram of an example communications environment 100 of an attack 140 on a host 145, such as a DDoS attack targeting the application layer of the host, according to one embodiment. The environment 100 comprises one or more client devices (or clients) 107, 105, 135, at least one host device (or host) 145, at least one control server 110, and at least one black market device (or black market) 115, all of with may have the ability to inter-communicate via a network 120.

The network 120 may be a communication network. The network 120 may transmit data between one or more of the clients 107, 105, 135, host 145, control server 110, and black market 115. In one embodiment, the network 120 may be the Internet. While only one network 120 is shown, nefarious entities such as the spam client, control server and black market may use an overlay network (e.g., a darknet) and/or auxiliary network using specific software, non-standard protocols, etc. for at least a portion of their communications. Example embodiments may include many hosts 145, control servers 110, spam clients 135, malicious clients 105, and new malicious clients 107 recently infected with malware 115.

In one example embodiment the network 120 may include wireless network and/or wired network. In one embodiment, the network 120 uses standard communications technologies and/or protocols. Thus, the network 120 may enable communications using, for example, technologies such as Ethernet, 802.11, integrated services digital network (ISDN), digital subscriber line (DSL), asynchronous transfer mode (ATM), etc. Similarly, the networking protocols used on the network 120 can include, for example, the transmission control protocol/Internet protocol (TCP/IP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), Java Script (Java), Asynchronous Java Script (AJAX), the extensible markup language (XML), etc. In addition, all or some of links can be encrypted using conventional encryption technologies such as the secure sockets layer (SSL), Secure HTTP (HTTPS) and/or virtual private networks (VPNs). In another example embodiment, the entities may use custom and/or dedicated data communications technologies instead of, or in addition to, the ones described above. For example, nefarious entities can also utilize a network 120 of dedicated or private communications links that are not necessarily part of the Internet but may overlay and utilize one or more network 120 components. In another example, clients may utilize provided network access points such as by an Internet Service Provider or Cellular Provider (Service Provider) to transmit and receive data over the 120 network. Thus, a service provider may implement and manage a wireless or wired access point and associated infrastructure to provide client devices or users of the client devices access to the network 120 through a paid service.

In one example embodiment, a client, e.g., 105, 107, 135, is a computing device with network capabilities for transmitting and receiving data packets over the network 120. The client devices 105, 107, 135 may be wireless enabled mobile computing devices (laptops, netbooks, tablets, smart telephones, etc.) and/or wired and/or wireless home computing devices (e.g., a laptop, personal computer, media computer, etc.) that include applications or frameworks for accessing online data. Example applications for accessing online data include applications such as a web browser, widgets, mobile applications, utilities, etc. that request, send, and/or receive data over the network and may present received data to the user (e.g., as rendered web content, weather forecast, sports scores, etc.).

In addition, example applications may include malware 115 either as a standalone process and/or process infecting the client. The malware 115 may include or utilize an existing application and/or framework of the client to perform illegitimate online activities. For example, malware may include a headless browser framework that may initiate illegitimate requests and/or responses (e.g., for one or more features or functionality of a webpage) to a host 145. In another example, malware may infect a browser and may cause the browser to initiate illegitimate request and/or responses (e.g., for one or more features or functionality of a webpage) to a host 145. In yet another example, malware may infect a widget or application may initiate illegitimate requests and/or responses (e.g., for one or more features or functionality of an application programming interface (API)) to a host 145.

The requests and/or responses from the malware 115 may target a specific feature or functionality of the host 145, such as an application programming interface (API) of the host that communicates information to an application or widget, or a component within online content provided by the host that causes the host to perform a function such as generate a shopping cart, checkout purchases, etc. More generally, the malware 115 causes infected clients 105, 107 to perform actions the users of the clients do not initiate (e.g., engage in illegitimate non-user activities). Oftentimes, the users of the infected clients 105, 107 are unaware of the illegitimate activities of their client devices.

In some example embodiments, an attack on a host 140 may be orchestrated through a bot net 101. In one example embodiment, a bot net 101 may be a collection of computing devices, e.g., malicious clients 105, that are infected with malicious software (e.g., malware 115). The bot net 101 may be controlled by an attacker. Oftentimes the users of the malicious clients 105 are unaware their devices are infected with malware 115 and controllable by an attacker. Malicious clients 105 may infect new malicious clients 107 with the malware 115, which in turn become constituents of the bot net 101. Thus, the bot net 101 expands in size as more and more clients are infected. Bot nets 101 are utilized to commit a variety of cybercrimes such as spamming, infecting new malicious clients 107 with malware 115, and DDoS attacks.

In some example embodiments, a control server 110 may be configured to communicate with the malicious clients 105 infected with malware 115 and constituting the bot net 101 is responsible for orchestrating attacks on hosts 140 such as DDoS attacks as well as other cybercrimes. In some example embodiments, the operator of a control server 110 may sell or rent out access to the bot net 101 on a black market 115. An attacker utilizing a spam client 135 may either control a bot net 101 via their control server 110 (e.g., in instances where the attacker purchased the bot net 101 over the black market 115 or constructed the bot net 101 themselves) or rent access to the bot net 101 and control server 110 via the black market 115. In either instance, the spam client 135 may instruct the control server 110 to command the malicious client 105 constituents of the bot net 101 to carry out an attack on the host 140.

An example attack on the host 140 may be a DDoS attack that targets the application layer (layer 7) of the host 145 in the Open Systems Interconnection (OSI) model. Unchecked, the attack 140 may maliciously over-exercise specific functions or features at the application layer of the host 145 with the intention to disable those functions or features for legitimate users. The over-exercising of functions or features drains the host of resources available for legitimate, non-malicious user activities. Example host resources drained during an application layer DDoS attack may include compute resources for dynamically generated web content, database resources, search index resources, ecommerce components, and application programming interface (API) endpoints.

In example embodiments described herein, the host 145 may be a computing device (e.g., a server) or collection thereof providing features and functions such as dynamically generated web content, database resources, search index resources, ecommerce components, and application programming interface (API) endpoints to clients over the network 120. As the malware 115 infecting malicious clients 105, 107 affords the control server 110 with some degree of control over client functionality, the control server 110 may be instructed to command the constituent clients 105 of the bot net 101 infected with the malware 115 to engage the host 145 over the network 120. For example, the control server 110 may command malicious clients 105 within the bot net 101 to initiate network requests directed to the host 145 which exercise one or more functions or features of the host available to the clients, thus constituting an attack on the host 140. When the bot net 101 includes a sufficient number of constituent clients 105 simultaneously performing the activity, the attack on the host 140 orchestrated by the control server 110 maliciously over-exercises the specific functions or features of the host 145—thus draining host resources—via the bot net.

Shortcomings in Mitigating DDoS Attacks at Time of Attack

Figure 2:
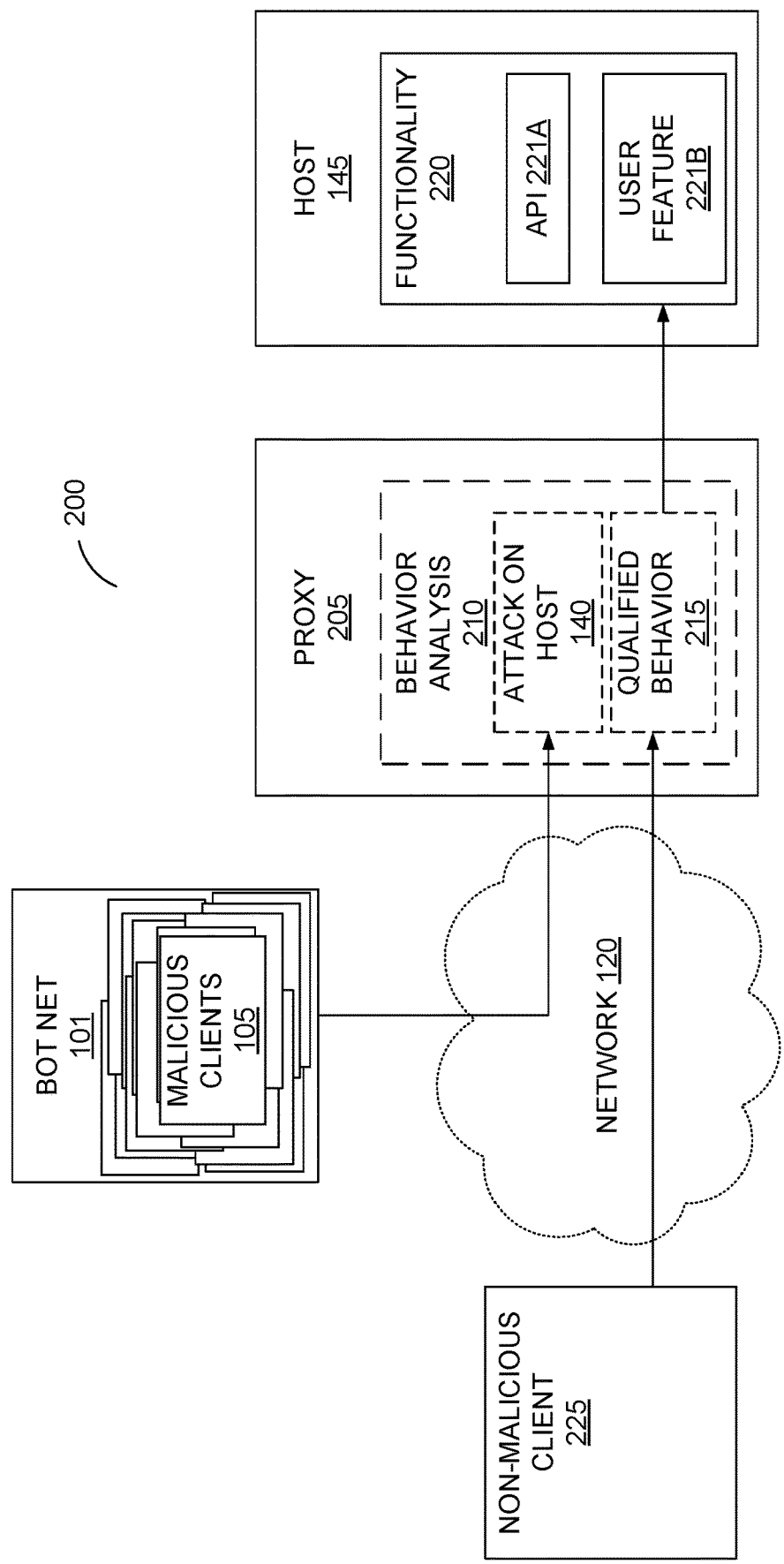
FIG. 2 illustrates a block diagram of an example communications environment including a proxy for mitigating an attack on a host, according to one example embodiment.

Turning now to FIG. 2, it illustrates a block diagram of an example communications environment 200. The example communication environment may include a proxy 205 for mitigating an attack on a host 140, according to one embodiment. The environment 200 may include a bot net 101 of malicious clients 105, a non-malicious client 225, a proxy 205, and a host 145.

In one example embodiment, the proxy 205 is positioned between the host 145 and the network 120, such that communications between clients 105, 225, and the host 145 flow through the proxy 205. In one example embodiment, the proxy 205 is a standalone computing device, such as server, or collection thereof that handles traffic between the host 145 and the clients 105, 225. In some example embodiments, the proxy 205 may be incorporated at the host 140 and logically process traffic (e.g., as a pre-processing filter) prior to traffic being processed by the host. Thus, the proxy 205 may be a server, load balancer, or router located logically and/or physically between the clients 105, 225, the network 120, and/or host 145 to monitor and manage the request/response path between the clients and the host. In other example embodiments, the proxy 205 may be incorporated in the host 145. In either instance, the proxy 205 may receive traffic (e.g., client requests and responses) from the clients 105, 225, which may then be passed on to the host 145. The proxy 2015 also may receive traffic (e.g., host 145 requests and responses) from the host 145, which may then be passed on to the clients 105, 225. In one example embodiment, the proxy 205 is a HTTP(S) proxy that handles traffic between the host 145 and clients 105, 225. Thus, the proxy 205 provides client access to the features and functionality 220 of the host 145, including user features 221B such as dynamically generated web content, database resources, search index resources, ecommerce components, and application programming interface 221A endpoints over the network 120, but without exposing the host 145 directly to the clients.

In some example embodiments, the proxy 205 also may service client 105, 225 requests/responses directly and/or request/respond to the clients as part of its operation. As an example, the proxy 205 may perform request and/or response operations separate from the features and functionality of the host 145 in response to a client request or response.

The proxy 205 may perform a behavior analysis 210 responsible for learning about the behavior of clients engaging the functionality 220 of the host 145. For example, the proxy 205 may analyze client behavior to distinguish between the behavior of non-malicious clients 225 and malicious clients 105. In turn, the proxy 205 may determine that a client engaging the host is a non-malicious client 225 exhibiting qualified behavior 215 and should be permitted access to the functionality 220 of the host 145. Alternatively, the proxy 205 may determine that a client engaging the host is a malicious client 105, which may be involved in an attack on the host 140 and thus denied access to the functionality 220 of the host 145.

The effects of resource drainage at the host 145 incurred by application layer DDoS attacks 140 may be mitigated through behavior analysis 210 applied at the proxy 205 that seeks to identify malicious client 105 behavior as the attack occurs. That is, at the time of an attack 140, the behavior analysis 210 attempts to separate non-malicious 225 clients from malicious clients 105. For example, the proxy 205 may employ mitigation techniques such as issue HTTP authentication challenges through client browser redirection, track client requests for host functionality 220, provide a CAPTCHA, and retrieve HTTP header signatures (e.g., user-agent, HTTP version, HTTP method, etc.), all of which may implicate malicious clients 105 based on client response, lack thereof, or the information therein which the behavior analysis 210 examines in an attempt to identify the malicious clients and subsequently deny their access to the host 145. For example, the behavior analysis 210 may determine that clients not responding at an HTTP redirect address, continually requesting a host functionality 220 at a rate above a threshold, failing a CAPTCHAs, and/or having inconsistent or incorrect HTTP header signatures are malicious clients 105. In addition, the proxy 205 may maintain a blacklist of IPs associated with known malicious clients identified through threat intelligence.

While implementing a proxy 205 with the above functionality may provide a layer of security, there may be some potential shortcomings to address. Specifically, the above techniques often generate a significant number of false positives that degrade legitimate user experience when employed at the time of an attack 140. A false positive is an instance where a given attack mitigation technique employed by the proxy 205 rejects a valid request from a non-malicious 225 client. In other words, the proxy 205 incorrectly classifies the behavior of a non-malicious client 225 as an attack on the host 140 rather than qualified behavior 215, and denies the client 225 access to the functionality 220 of the host 145. Consequently, the legitimate user of the non-malicious client 225 cannot access the functionality 220 of the host 145 and perceives a poor user experience. Additionally, in many instances, the sheer number of previously unknown malicious clients 105 participating in an orchestrated botnet 101 attack can overwhelm the ability of the proxy 205 to effectively employ the aforementioned mitigation techniques and perform behavior analysis 210 at the time of an attack.

Further, many of the aforementioned mitigation techniques do not provide adequate protection for functionality 220 of the host 145 that are not user facing, such as API 221A endpoints. Unlike user features 221B, API 221A functionality 220 of the host 145 is often not intended for direct user consumption, but rather by client 105, 225 applications as part of their normal function. As a result, the amount of available information about client behavior for behavior analysis 210 in response to client engagement of API 221A functionality 220 provided by the host 145 at the time of an attack can be significantly reduced. Not only does the reduction of available information for analysis make it more difficult for the proxy 205 to distinguish between malicious clients 105 and non-malicious 225, but typically causes a significant increase in the number of false positives. Example client applications using API endpoints can include mobile applications and other API driven applications that automatically engage the host 145 for content (e.g., automatic updates).

Qualification of non-malicious clients 225 prior to a time of attack 140 can significantly reduce the rate of false positives when employing the above and other techniques at the proxy 205 to mitigate DDoS attacks, and is discussed in detail below.

Client Qualification in Mitigating DDoS Attacks

Figure 3:
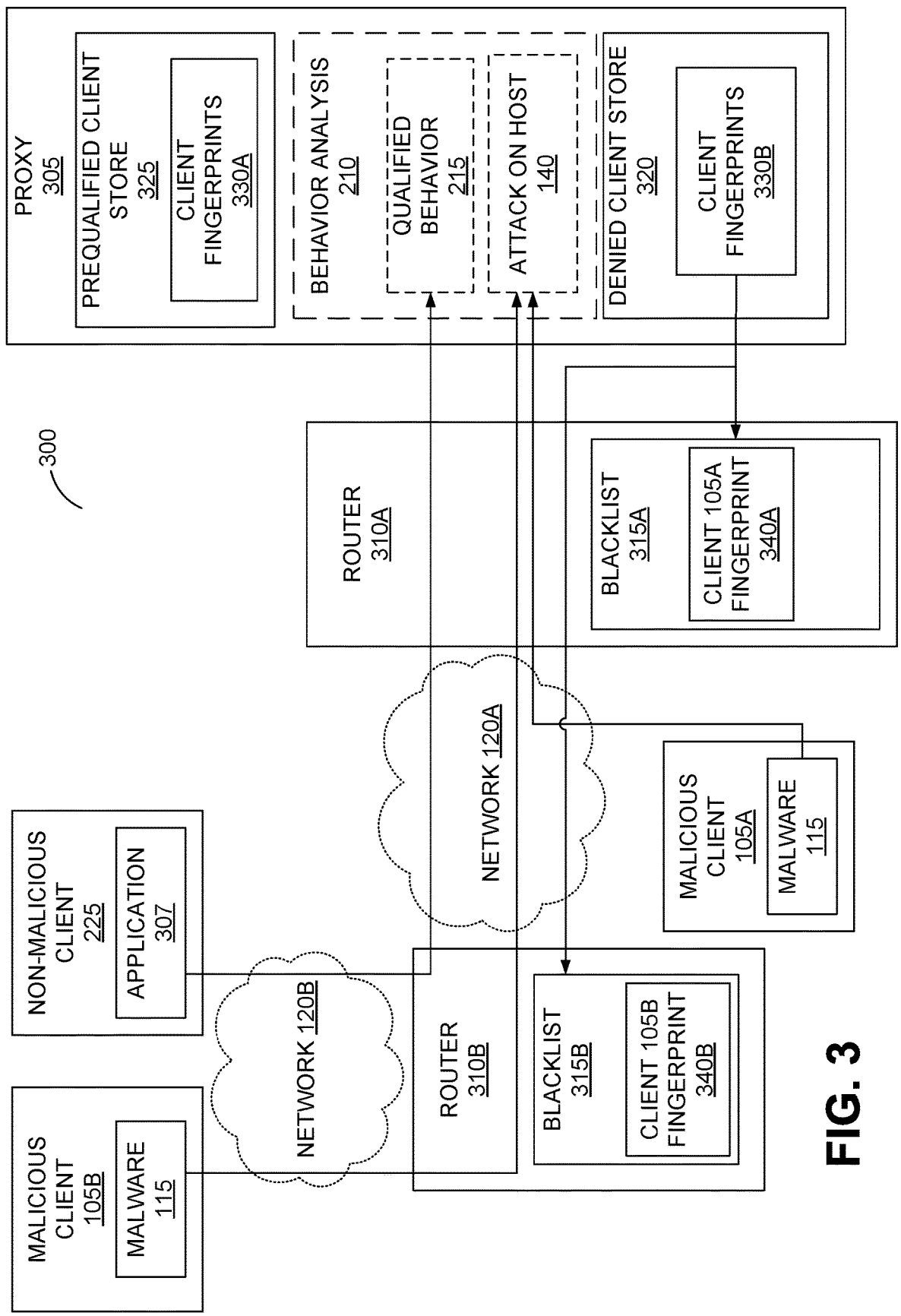
FIG. 3 illustrates a block diagram of an example communications environment including a proxy and a router for mitigating an attack on a host, according to one example embodiment.

Referring to FIG. 3, it illustrates a block diagram of an example communications environment 300 including a proxy 305 and a router 310 for mitigating an attack on a host 140, according to one example embodiment. The environment 300 may include example malicious clients 105A, 105B, which may be constituents of a bot net, a non-malicious client 225, a proxy 305, and routers 310A, 310B. In some example embodiments, the proxy 305 may be incorporated at a host and logically process traffic (e.g., as a pre-processing filter) prior to traffic being processed by the host.

The proxy 305 may handle traffic between a host (not shown) and clients 105, 225 in a manner similar to that previously described with respect to FIG. 2. Over the proxy (e.g., 205) described with respect to FIG. 2, the proxy 305 of FIG. 3 includes a prequalified client store 325 and denied client store 320. The prequalified client store 325 includes client fingerprints 330A of non-malicious clients (e.g., client 225) prequalified to access some level of functionality at the host.

The denied client store 320 may include client fingerprints 330B of clients that the behavior analysis 210 has identified as malicious, such as malicious clients 105 infected with malware 115 that attempts to over exercise functionality of the host in a bot net attack on the host 140. Accordingly, the proxy 305 may deny malicious clients 105 access to the features and functionality of the host. In some example embodiments, the proxy 305 provides client fingerprint 330B information about malicious clients 105 to upstream routers. The routers 310A, 310B utilize the provided information in blacklists 315A, 315B to deny requests from malicious clients 105 prior to the requests reaching the proxy 305. Thus, the amount of illegitimate traffic received at the proxy 305 decreases as malicious client 105 fingerprints are stored in the denied client store 320 and malicious client fingerprint 330B information is provided to upstream routers 310.

In many instances, during an attack on a host 140, the sheer number of previously unknown malicious clients (e.g., 105A, 105B) participating in an orchestrated botnet attack can overwhelm the ability of the proxy 305 to effectively employ mitigation techniques and perform behavior analysis 210 at the time of an attack. This may lead to a high number of false positives, shutdown of the proxy, and other effects that negatively impact the host/proxy and degrade legitimate user experience.

Rather than attempt to distinguish non-malicious clients 225 from many malicious clients 105 at the time of attack, the proxy 305 may prequalify non-malicious client 225 access to the host prior to an attack on the host 140. Identities of the prequalified clients are maintained as client fingerprints 330A in the prequalified client store 325. Thus, when a non-malicious client 225 whose fingerprint 330A is maintained in the prequalified client store 325 engages the host during a period of attack 140, the proxy 305 can more easily determine that the client behavior is a qualified behavior 215. Prequalifying as many non-malicious clients 225 as possible prior to an attack on the host 140 greatly reduces the number of false positives among non-malicious clients 225. As an example, consider a prequalified client store 325 including client fingerprints 330A for 95% of non-malicious clients 225 requesting access to the host during an attack period while the other 5% of non-malicious clients 225 requesting access to the host are unknown to the proxy 305. The rate of false positives generated by behavior analysis 210 at the time of attack is significantly reduced because the proxy 305 only attempts to distinguish the 5% of non-malicious clients unknown to the proxy 305 (e.g., not identifiable by a client fingerprint 330A in the prequalified client store 325) from the malicious clients 105. Thus, the number of non-malicious clients 225 that may be misidentified as malicious is greatly reduced.

In order to build the prequalified client store 325, the behavior analysis 210 monitors the behavior of clients engaging the host through the proxy 305 to access features and functionality of the host. For example, a user of a non-malicious client 225 may utilize an application 307 to engage the host or the application 307 may engage the host as part of its normal operation. As clients, e.g., 105A, 105B, 225, engage the host, the proxy 305 determines an identity, or fingerprint 330, of each client engaging the host. A client fingerprint 330 provides a relatively stable representation of a client such that the proxy 305 may distinguish the client from other clients engaging the host over some period of time (e.g., 5 minutes, an hour, a day, a week, etc.). The longer a fingerprint is usable by the proxy 305 to identify a particular client, the more stable the representation. As client configuration, network access points, addresses, etc. change with varying degrees of frequency, the fingerprint need not provide a permanent representation of clients. However, a client fingerprint may provide a sufficiently stable representation to substantially identify the non-malicious clients 225 engaging the host during attacks on the host 140 such as DDoS attacks.

To that end, the proxy 305 may continuously monitor behavior of the clients engaging host and may prequalify non-malicious clients 225, storing their fingerprints 330A in the prequalified client store 325, based on an analysis of the client's behavior. For example, the behavior analysis 210 may prequalify a non-malicious client 225 in response to the client engaging in qualified behavior 215. As described above, the proxy 305 prequalifies non-malicious clients prior to periods of attack such that non-malicious clients 225 having a corresponding client fingerprint 330A stored in the prequalified client store 325 may access the host during the period of attack with zero to minimal intrusion on legitimate user experience.

The proxy 305 may utilize the denied client store 320 containing client fingerprints 330B of malicious clients 105 to deny access to the features and functionality of the host during non-attack and attack periods. However, as periods of attacks are often characterized by an abnormal level of engagement from previously unknown clients, the denied client store 320 does not capture the fingerprints 330B of the majority of malicious clients 105 (prior to an attack) that will attempt to engage the host during an attack 140. Instead, because a majority of the non-malicious clients 225 that are identifiable from their fingerprints 330A within the prequalified client store 325, the behavior analysis 210 may employ aggressive measures (e.g., challenging and/or blocking) against unknown clients (which are more likely malicious client 105) during periods of attack 140 to deny their access to the host without impacting identifiable non-malicious clients 225. For example, during an identified attack on the host 140, behavior analysis 210 may assume unknown clients are malicious and add their client fingerprints 330B to the denied client store 320. Recognizing that some of these unknown clients may be legitimate, the addition of fingerprints 330B to the denied client store 320 during an attack period may be temporary, e.g., on a timer, until the proxy 305 identifies that attack on the host has ended, or an administrator deems that the attack on the host has ended. In some embodiments, the behavior analysis 210 and/or administrator analyzes captured data after an attack period to selectively remove the client fingerprints 330B added to the denied client store 320 during the attack period.

As shown, the environment 300 may include routers 310A and 310B. Example embodiments may include none or more routers depending on the configuration. The routers may handle communications between endpoints. For example, router 310A may handle traffic flowing from network 120A to the proxy 305, and traffic flowing onto the network 120A from the proxy 305. Thus, the communications of clients 105A, 105B, and 225 may flow through the router 310A. Additional routers 310B may also be positioned throughout the environment 300. For example, router 310B may handle traffic between network segment 120A and network segment 120B. Thus, the communications of clients 105B and 225 flow from network 120B through router 310B to network 120B. In one embodiment, a router 310 is a standalone computing device, such as server, networking router, load balancer, or collection thereof that routes traffic between entities within the environment 300.

In some embodiments, a router 310 may include a blacklist 315 for denying the requests of one or more clients. Specifically, the blacklist 315 may contain client fingerprint information corresponding to clients 105 deemed malicious by the proxy 305. For example, the proxy 305 may provide an interface for routers 310 to retrieve client fingerprint 330B information from the denied client store 320 for populating the blacklist 315 or push client fingerprint information from the denied client store to one or more routers for populating the blacklist in order to offload request denials for malicious clients from the proxy. In either instance, a router 310 may utilize the blacklist 315 to deny requests from malicious clients 105 and thus prevent them from reaching the endpoint (e.g., proxy 305). This process of building the blacklist 315 from the denied client store 320, as it relates to the proxy 305, reduces the number of malicious clients 105 engaging the proxy 305 over time and thus the number of malicious requests the proxy 305 handles over the course of an attack on a host 140 to prevent the proxy from being overloaded.

Figure 4:
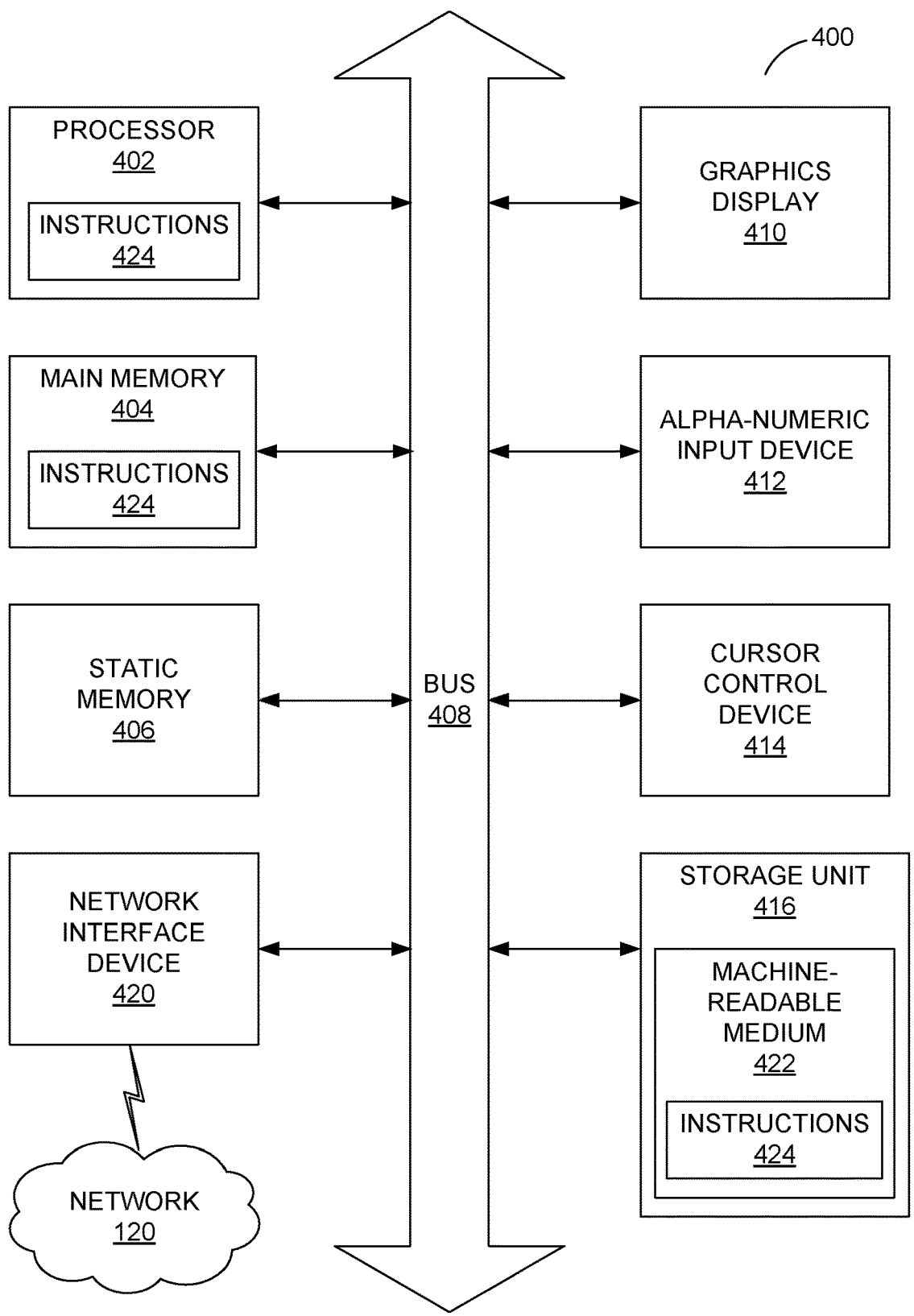
FIG. 4 illustrates an example architecture of a computing device, components of the architecture can correspond to components in embodiments of computing devices such as clients, host, routers, and proxy.

As multiple routers 310 may be positioned between the proxy 305 and a client, e.g., malicious client 105B, the proxy 305 may identify and then provide client fingerprint information 330B from the denied client store 320 to a most upstream router in order to reduce the amount of malicious traffic on one or more networks. For example, the proxy 305 may provide client 105B fingerprint 340B information to router 310B such that requests generated by the malware 115 on malicious client 105B do not flow onto network 120A. Similarly, router 310A may receive client 105A fingerprint 340A information as it is the most upstream router for denying requests generated by the malware on malicious client 105A. In some example embodiments, as router 310A also may handle requests from malicious client 105B, it also may receive client 105B fingerprint information 340B. In other example embodiments, all routers may receive fingerprint information for each client identified to the denied client store 320 by the proxy 305. In this way, malicious traffic on the networks 120 and downstream routers (e.g., 310A) may be reduced in addition to reducing malicious requests received at the proxy 305 subsequent to identification of malicious clients 105 to the denied client store 320.
Example System Components FIG. 4 illustrates an example architecture of a computing device. Portions or all of the components of the architecture may correspond to components in embodiments of computing devices such as client devices, host, spam client, control server, black market and/or proxy. As such, FIG. 4 illustrates components able to read instructions from a machine-readable medium and execute them on one or more processors (or controllers) to implement embodiments of the disclosed system for mitigating attacks, such as DDoS attacks, on a host, according to one embodiment. For example, clients 105, 107, 135, 225, proxy server 205, 305, host 145, and routers 310, among other entities described herein may include one or more of the components illustrated in FIG. 4. Specifically, FIG. 4 shows a diagrammatic representation of a machine in the example form of a computer system 400 within which instructions 424 (e.g., software or program code) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, an internet of things (IoT) device, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 300 includes one or more processors 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or the like. The computer system 400 may also include alphanumeric input device 412 (e.g., a keyboard— hardware and/or software based), a cursor control device 414 (e.g., touch screen response, a mouse, a trackball, a joystick, a motion sensor, or other pointing instrument), a storage unit 416, and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 120 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Example Proxy Server

Figure 5:
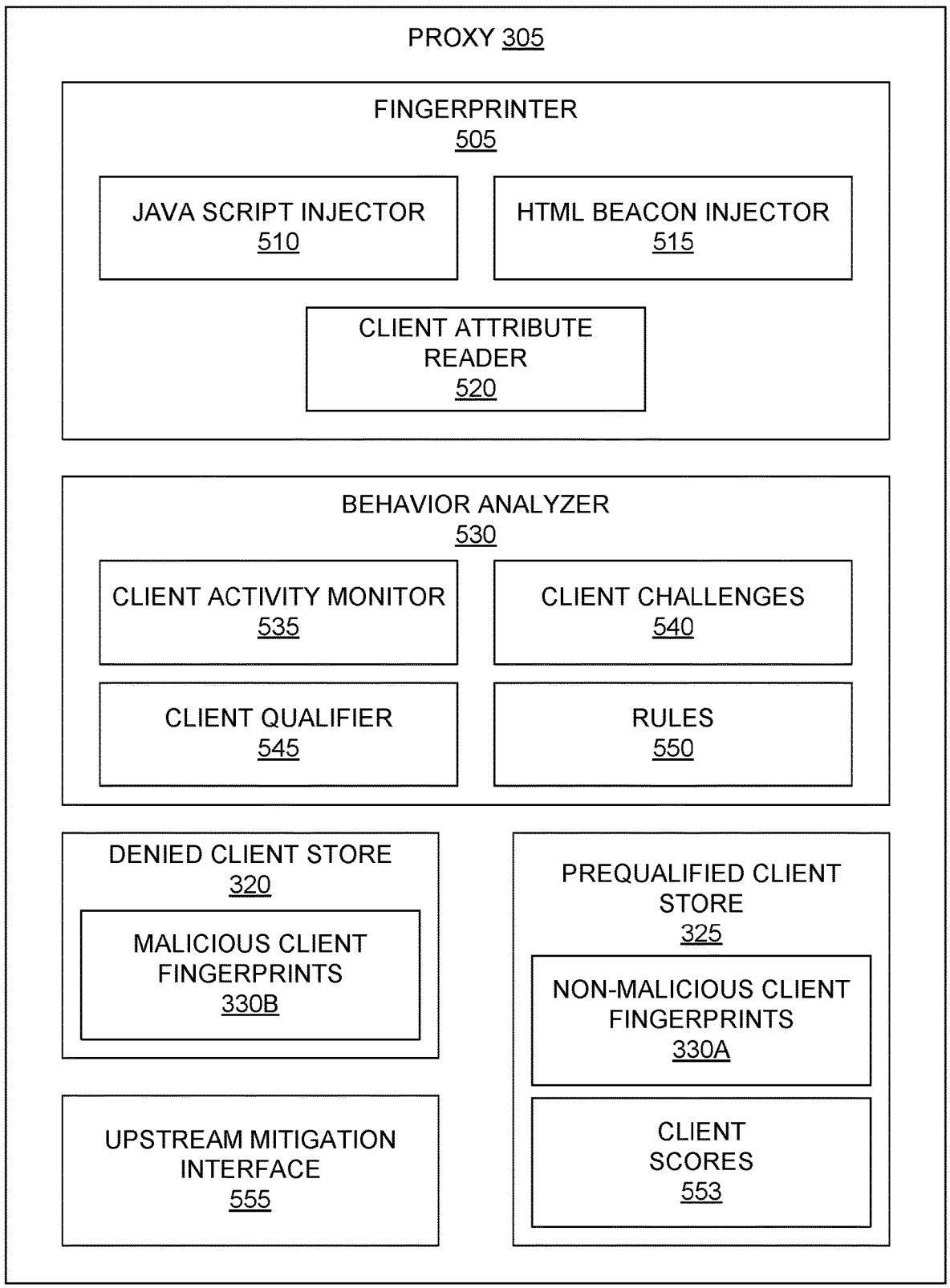
FIG. 5 illustrates a block diagram of a proxy for qualifying clients based on their behavior to mitigate attacks on a host, according to one example embodiment.

Referring now to FIG. 5, it illustrates an example block diagram of a proxy 305 for qualifying clients based on the behavior to mitigate attacks on a host, according to one embodiment. As shown, the example proxy 305 includes a fingerprinter 505, behavior analyzer 530, denied client store 320, prequalified client store 325, and an upstream mitigation interface 555.

The fingerprinter 505 includes a JAVA script injector 510, an HTML beacon injector 515, and a client attribute reader 520. By way of example, the fingerprinter 505 determines a fingerprint of a client engaging a host. The fingerprint represents the identity of the client at the proxy 305, such that different clients are distinguishable from each other. Many systems use internet protocol (IP) addresses to identify clients. However, IP addresses offer a very crude approximation of client identity because IP addresses may change over time (e.g., through the dynamic host control protocol, or DHCP). In addition, many clients may share a same IP address. For example, clients in remote geographies such as South America or China utilize "Mega Proxies" which hide the true IP addresses of individual clients. Thus, relying on IP addresses makes it difficult to distinguish individual clients because multiple clients may have a same IP address and/or frequently have a new IP address as seen by the proxy 305. Moreover, blocking an IP address of a malicious client may inadvertently capture many non-malicious clients. A client fingerprint more uniquely represents a given client than its IP address alone such that individual clients may be more uniquely identified.

In one example embodiment, the fingerprinter 505 determines the fingerprint of a client based on one or more attributes of the client. Attributes of the client utilized in a fingerprint may include an operating system type, operating system version, system language, screen size, screen resolution, browser type, browser installed fonts, browser installed plugins, browser version, system timezone, application type, application version, application installed plugins, etc. or other determinable attributes. The combination of these client attributes, which may be represented as Boolean (true/false) values, whole values, or character value make up the fingerprint of the client. In some example embodiments, the values are hashed, in which case the fingerprint of the client may be a hash value of the client attributes. Although client IP address remains useful, combinations of these attributes more accurately represent individual clients over time than IP address alone. For example, while a client IP address may change throughout the day, an OS version and type combined with browser version and type along with screen size and screen resolution are much less likely to change, which provides a much more stable representation of the client identity than a changing IP address. Thus, even when a client IP address changes, the proxy 305 may still be able to uniquely identify the client based on the representative combination of attributes in the fingerprint.

The fingerprinter 505 may determine a fingerprint of a client in a number of ways. To begin the process, the fingerprinter 505 may utilize JavaScript injection to deliver a portion of JavaScript code to the client which, when executed, determines one or more attributes of the client. As an example, the client may request a feature or functionality of the host, which the proxy 305 receives and passes on to the host. In turn, the proxy 305 receives a response from the host destined for the client. If a fingerprint has not yet been determined for the client, the proxy 305 provides the response to the fingerprinter 505. The fingerprinter 505 modifies the response prior to passing the response to the client by passing the response through the java script injector 510.

The java script injector 510 may inject a small portion of JavaScript code into the response that will be executed by the client. The portion of JavaScript code causes the JavaScript engine of the client to query the client for client attributes such as operating system type, operating system version, system language, screen size, screen resolution, browser type, browser installed fonts, browser installed plugins, browser version, system timezone, application type, application version, application installed plugins, etc. For example, the java script injector 510 may inject the JavaScript code in content delivered to the client. Upon receipt of the content, a client application, such as a browser including a JavaScript engine executes the portion of injected JavaScript code which causes the JavaScript engine to request for browser runtime information including the client attributes. In turn, the portion of injected JavaScript code makes the client attributes retrieved by the client JavaScript engine available to the fingerprinter 505.

In one embodiment, the portion of JavaScript makes the client attributes available to the fingerprinter 505 by generating a cookie on the client including the client attributes for the fingerprint of the client. The portion of JavaScript may also hash the attributes of the client, in which case the cookie includes the hash value of the client attributes for the fingerprint of the client. For example, the hash value of the client fingerprint may be set in an HTTP header of the cookie. In turn, when the client next engages the host, the client attribute reader 520 retrieves the client attributes and/or hash thereof from the cookie and stores the client attributes (and/or the hash thereof) as the fingerprint for the client device.

In one embodiment, the client attribute reader 520 may retrieve the client attributes and/or hash thereof with asynchronous JavaScript+XML (AJAX) requests. For example, the portion of JavaScript provided to client, when executed, may be configured to perform a call to the proxy 305 from the client JavaScript engine based on instructions in the portion of executed JavaScript. In turn, the client attribute reader 520 communicates with the client JavaScript engine via AJAX to retrieve the client attributes and/or hash thereof and stores the client attributes (and/or the hash thereof) as the fingerprint for the client device.

In some embodiments, the fingerprinter 505 may utilize an HTML beacon to retrieve the client attributes. Depending on the embodiment, the fingerprinter 505 may perform HTML beacon injection subsequent to or coincident with providing the portion of JavaScript code via the java script injector 510 to retrieve client attributes. As an example, the client may request a feature or functionality of the host, which the proxy 305 receives and passes on to the host. In turn, the proxy 305 receives a response from the host destined for the client. If a fingerprint has not yet been determined for the client, the proxy 305 provides the response to the fingerprinter 505. The fingerprinter 505 may modify the response prior to passing the response to the client by passing the response through the HTML beacon injector 515. In some embodiments, the response may be passed through both the java script injector 510 and the beacon injector 515. In other embodiments, the response may be passed through the beacon injector 515 subsequent to a response passed through the java script injector 510 and transmitted to the client.

The HTML beacon injector 515 injects a small pixel (e.g., 1×1) or "beacon" that the client will attempt to retrieve into the content, such as HTML content, included in the response destined for the client. The address of the beacon is set as the address of the proxy 305 such that attempts to retrieve the beacon (e.g., as an image) are directed to the proxy and accessible by the client attribute reader 520. Parameters of the beacon request (e.g., a query string to retrieve the beacon) are set based on the client attributes and/or hash thereof. Thus, when the client application renders the received content, the application generates a request for the beacon from the client attribute reader 520 that includes the attributes and/or hash thereof for the fingerprinter.

The fingerprinter 505 may hash the combination of read/received client attributes using a one-way hashing function to generate a (fairly) unique and stable string value (e.g., the fingerprint) that uniquely identifies the client. In some embodiments, the client attributes are hashed at the client and the hash value thereof is read/received by the client attribute reader 520. In turn, the fingerprinter 505 may utilize the received hash value as the fingerprint that uniquely identifies the client. In either instance, the fingerprinter 505 stores the combination of the client fingerprint and client address (e.g., identified from the network traffic associated with the client) as a relatively stable representation of the client.

The behavior analyzer 530 analyzes network traffic associated with a client engaging the host to monitor the behavior of the client. Based on the behavior of the client, the behavior analyzer 530 determines whether the client is malicious or non-malicious. In turn, the behavior analyzer 530 determines whether to prequalify a non-malicious client to engage the host or deny a malicious client from engaging the host. The behavior analyzer 530 may include a client activity monitor 535, one or more client challenges 540, a client qualifier 545, and one or more rules 550.

In one example embodiment, the client activity monitor 535 identifies requested URIs in the network traffic associated with a client that are indicative of client behavior when engaging the features and functionality of the host. Specific URIs requested by the client may be associated with the various features and functionality of the host. For example, the client activity monitor 535 may identify when the client accesses a shopping cart or checkout page in an ecommerce web application by distinguishing between requested URIs specific to the shopping cart and the URIs specific to the checkout page, e.g., www.domain.com/shoppingcart and www.domain.com/checkout, respectively. The client activity monitor 535 may track the URIs requested by the client to identify the current position (e.g., last URI requested) and the progression of the client through the features and functionality provided by the host (e.g., a sequence of URIs).

The client qualifier 545 may determine whether the behavior of a client tracked by the client activity monitor 535 while the client engages the host meets positive acceptance criteria indicative of a non-malicious client, e.g., based on the functionality or feature of host the client engaged and/or the sequence of functionality and features the client engaged. In one example embodiment, the client qualifier 545 identifies the IP address and fingerprint determined for a client that meets the positive acceptance criteria for prequalification to the prequalified client store 325. Thus, if the client meets the criteria (e.g., is non-malicious), the fingerprint 330A of the non-malicious client and IP address may be added to the prequalified client store 325. Alternatively, if the client does not meet the criteria and exhibits malicious behavior, the client qualifier 545 may identify the client to the denied client store 320, which stores the fingerprints 330B of the malicious client.

In one example embodiment, the client qualifier 545 may assign a score value to the URIs a client accesses that are tracked by the client activity monitor 535. Scores values may be based on the importance of URIs within the context of the functionality and features of the host and how indicative requests for the URI correspond to legitimate user behavior. For example, a higher score value for a particular URI may indicate that client requests for the URI typically correspond to legitimate user behavior. The following example table (Table 1) illustrates an example score value concept for a host providing ecommerce functionality:

TABLE 1

| URI | Score Value | Feature/Functionality |
| --- | --- | --- |
| /register/user/new | 15 | Registration Action |
| /register/user/thanks | 40 | Completed Registration |
| /shoppingcart/view | 30 | Shopping Cart (Tier 2) |
| /checkout | 40 | Checkout Page (Tier 1) |
| /order/thanks | 80 | Completed Order |

It is noted that a host may include many additional and/or other features and functionality for scoring that are not outlined explicitly above as different hosts serve different purposes. For example, while the above table may work well for an online shopping site, a host for a social network may include different features and functionality that are scored, such as comment posted, successful login, picture uploaded, etc. In another example, a host providing an API to client applications may include scores for which functions are requested.

As the client utilizes the features and functionality of the host, the client qualifier 545 may access the URIs tracked by the client activity monitor 535 and generate a score for the behavior of the client based on the corresponding score values for the accessed URIs. The client qualifier 545 may compare the generated score to a threshold to determine if the client in question should be prequalified, blocked, or challenged. The client qualifier 545 may store determined client scores 553 within the prequalified client store 325.

In some example embodiments, the features and functionality of the host are assigned to tiers. The client qualifier 545 may prequalify a client to utilize the features and functionality up to a given tier based on their score. For example, the score determined for a prequalified client may prequalify the client to tier 2 services, but not tier 1 without meeting a challenge. As an example, a client qualified to tier 2 services may be able to populate and view a shopping cart, but challenged to reach a checkout URI (tier 1 service). Higher score thresholds for prequalification means the host is more protected during DDoS attacks but also that more client fingerprints 330A are excluded from prequalified client store 325. Lower score thresholds for prequalification means the host is less protected because lower scored clients are included in the fingerprints 330A within the prequalified client store 325 and DDoS traffic may leak through.

The client qualifier 545 may utilize different rules 550 based on a determined state of the host. Specifically, the client qualifier 545 may utilize a first set of rules during a period where the host is not under attack and a second set of rules during an attack period. For example, during a period where the host is not under attack, the majority of client engagement of the host is legitimate. Accordingly, during a non-attack period, the client qualifier 545 may examine the information about client behavior collected by the client activity monitor 525 and reach a determination to prequalify client access or deny client access to the host based on the totality of the behavior of the client over a long period of time. In other words, the client qualifier 545 has ample time to prequalify clients that routinely engage the host and deny malicious clients because, although the client is malicious and should be blocked, the requests are not over exercising the features and functionality of the host in a large scale DDoS attack. In contrast, during an attack period, the majority of client engagement of the host is illegitimate. Thus, the client qualifier 545 must make a quick determination during an attack period as to whether a client is malicious.

In one example embodiment, the rules 550 for an attack period include multiple thresholds based on client scores such that the client qualifier 545 may take quick action against malicious clients. In an example embodiment, the client qualifier 545 determines that the host is under a DDoS attack in response to an abnormal increase in unknown client engagement and/or engagement from clients that may be known, but are not yet prequalified. Example rules 550 utilized by the client qualifier 545 during an attack period may include:

For unknown clients: Client score<low threshold→default deny client.

For known but non-prequalified clients: Low threshold<client score<medium threshold→challenge client and block client if challenge is failed.

For prequalified clients: Medium threshold<client score<high threshold→permit client access to tier 2 features and functionality but challenge client access to tier 1 features and functionality. If the client fails the challenge, client access to tier 1 features and functionality is denied and subsequent access to tier 2 features may be challenged.

For prequalified clients: High threshold<client score→permit client access to tier 2 and tier 1 features and functionality.

Once unknown client engagement ceases, the client qualifier 545 may remove one or more clients that were denied access during an attack period from the denied client store 320 and revert to non-attack period behavior analysis to build the denied client store 320 and prequalified client store 325.

As described above, the client qualifier 545 may determine to challenge a client prior to denying/permitting access to the host. Client challenges 540 can include HTTP authentication challenges through client browser redirection, provide a CAPTCHA, and retrieve HTTP header signatures (e.g., user-agent, HTTP version, HTTP method, etc.), all of which may implicate malicious clients based on client response. In turn, the client activity monitor 535 receives the client response to the challenge which the client qualifier 545 may pass or fail. If the client fails, the client qualifier 545 may repeat the challenge, select a new challenge from available client challenges 540, or deny the client (e.g., after one or more failed challenges).

The upstream mitigation interface 555 provides a communication interface to upstream routers, firewalls, or other mitigation devices for denying client access further up the communication pathway from the client to the proxy 305 to reduce the amount of malicious network traffic on the network and offload processing from the proxy and/or other downstream devices. For example, the upstream mitigation interface 555 may provide client fingerprint 330B information such as corresponding IP addresses of clients identified to the denied client store 320 to upstream routers, firewalls or other mitigation devices for blocking at the IP level as these devices are more suitable to filtering high volumes of traffic. In some embodiments, the upstream devices may utilize other client fingerprint information in addition to IP address information. A block may be temporary e.g., for clients denied during an attack, or permanent, e.g., clients denied based on non-attack behavior analysis, and the timeframe for the block may be determined by the client qualifier 545 when the client to be denied is identified to the denied client store 320.

In one embodiment, the upstream mitigation interface 555 places the IP addresses of denied clients identified to the denied client store 320 into a message queue. In turn, a router may listen to the message queue and pull the IPs from the message queue to block those client requests. In other embodiments, the upstream mitigation interface 555 may push IP addressed added to the message queue to one or more upstream mitigation devices.

Client Fingerprinting

Figure 6A:
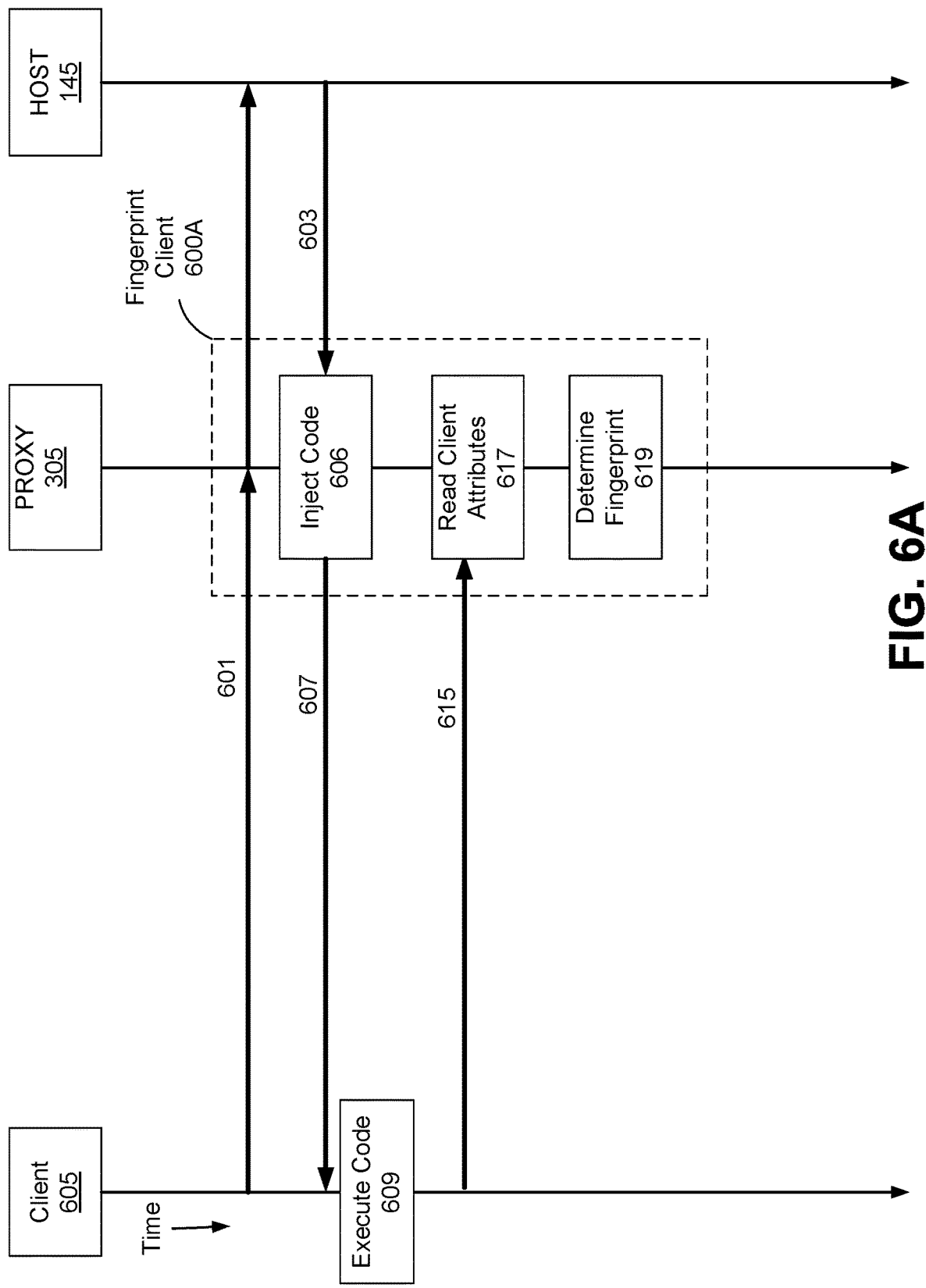
FIG. 6A illustrates an example event trace for fingerprinting a client, according to an example embodiment.

FIG. 6A illustrates an example event trace for fingerprinting 600A a client, according to an embodiment. FIG. 6A shows a client 605 which could be a malicious or non-malicious client, proxy 305, and host 145. Each of these may be a computing device as described with reference to FIGS. 1-4. The proxy server 305 receives an initial request 601 from the client 605 for a feature or functionality of the host 145. For example, a client 605 application such as a browser may request a web page provided by the host. The proxy 305 passes the request 601 to the host 145 which generates a response 603 to the client request and passes the response to the proxy 305. If the client 605 is unknown to the proxy 305, the proxy 305 fingerprints the client 600A.

To fingerprint 600A the client 605, the proxy 305 modifies the response 603 from the host 145 by injecting 606 executable code into the host response 603. In turn, the proxy 305 transmits the modified response 607 including the executable code to the client 605. In turn, the client 605 executes 609 the injected code. The injected code 606, when executed 609, determines attributes about the client 605.

For example, the client 605 may execute 609 JavaScript code that causes the JavaScript engine of the client to query the client for client attributes. Example of client attributes may be operating system type, operating system version, system language, screen size, screen resolution, browser type, browser installed fonts, browser installed plugins, browser version, system timezone, application type, application version, application installed plugins, etc. The client attributes and/or hash thereof are then provided 615 to the proxy 305, which reads the received attributes 617 and determines the fingerprint 619 for the client 605.

In one embodiment, the portion of JavaScript executed 609 by the client generates a cookie on the client including the client attributes (and/or hash thereof) for the fingerprint of the client and sets an HTTP header of the cookie with the attributes (and/or hash thereof). In turn, when the client 605 attempts to engage the host 145, the cookie is provided 615 to the proxy 305 which reads 617 the HTTP header to obtain the client attributes (and/or hash thereof) and determines the fingerprint 619 of the client.

In one embodiment, the portion of JavaScript executed 609 by the client causes the client JavaScript engine to perform an AJAX call 615 to the proxy 305 to provide the client attributes (and/or hash thereof). In turn, the proxy 305 reads 617 the client attributes (and/or hash thereof) received from the JavaScript engine and determines the fingerprint 619 of the client.

Figure 6B:
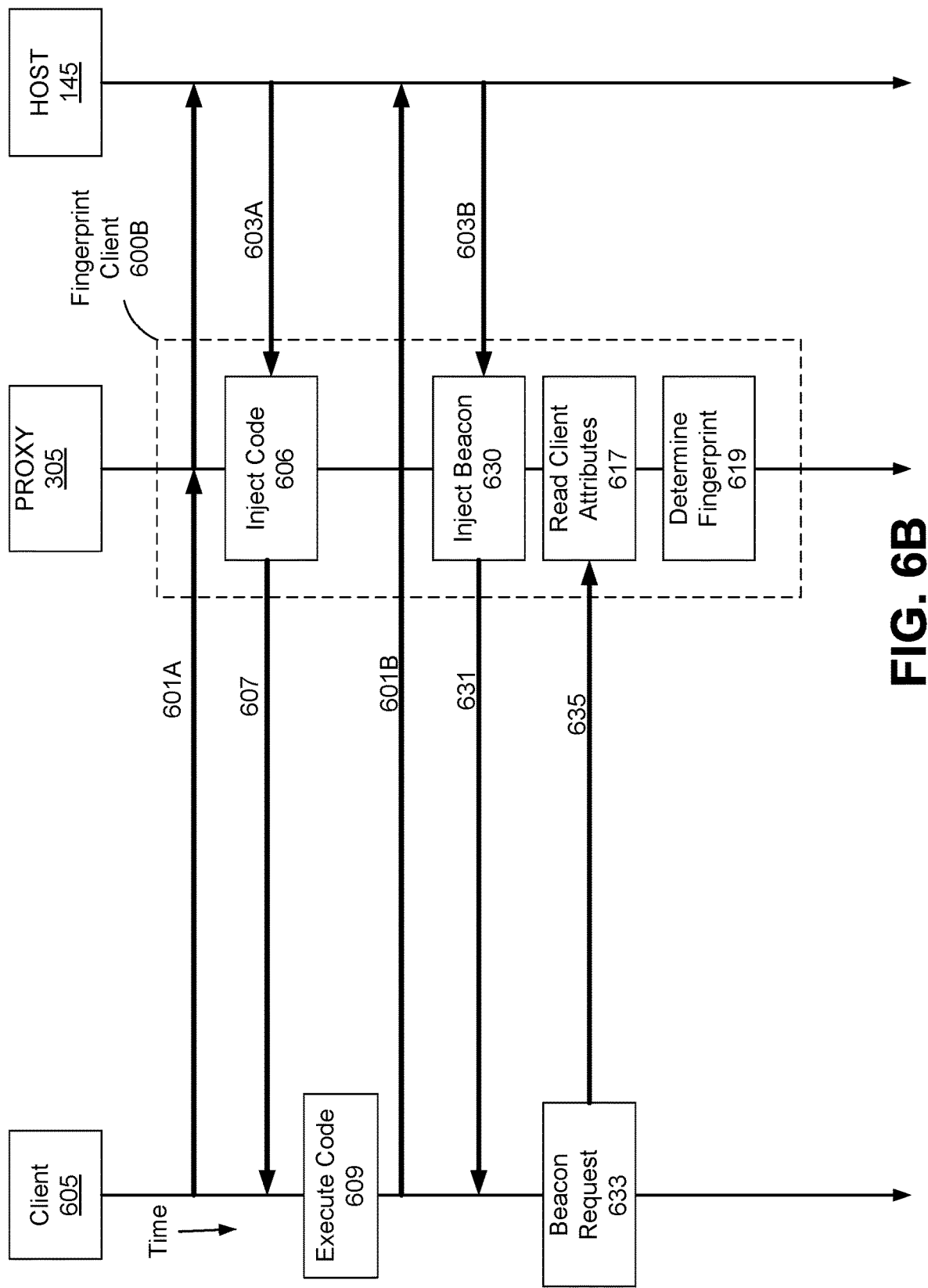
FIG. 6B illustrates an example event trace for fingerprinting a client, according to an example embodiment.

FIG. 6B illustrates an example event trace for fingerprinting 600B a client, according to an embodiment. FIG. 6B shows a client 605, proxy 305, and host 145. Each of these may be a computing device as described with FIGS. 1-4. The proxy server 305 receives an initial request 601A from the client 605 for a feature or functionality of the host 145. For example, a client 605 application such as a browser may request a web page provided by the host. The proxy 305 passes the request 601A to the host 145 which generates a response 603A to the client request and passes the response to the proxy 305. If the client 605 is unknown to the proxy 305, the proxy 305 fingerprints the client 600B.

To fingerprint 600B the client 605, the proxy 305 modifies the response 603A from the host 145 by injecting 606 executable code into the host response 603A. In turn, the proxy 305 transmits the modified response 607 including the executable code to the client 605. In turn, the client 605 executes 609 the injected code. The injected code 606, when executed 609, determines attributes about the client 605.

For example, the client 605 may execute 609 JavaScript code that causes the JavaScript engine of the client to query the client for client attributes. Examples of client attributes may be operating system type, operating system version, system language, screen size, screen resolution, browser type, browser installed fonts, browser installed plugins, browser version, system timezone, application type, application version, application installed plugins, etc. The client attributes and/or hash thereof may then be retrieved by the proxy 305 through a beacon request 633.

In order to retrieve client attributes (and/or hash thereof) through a beacon request 633, the proxy 305 identifies a request 601B from the client 605 for features or functionality of the host 145. In some embodiments, request 601B and response 603B may be the same request and response as initial request 601A and host response 603A. In other embodiments, request 601B and response 603B may correspond to a request subsequent to initial request 601A and host response subsequent to host response 603A.

The proxy 305 passes the request 601B to the host 145 which generates a response 603B to the client request and passes the response to the proxy 305. The proxy 305 modifies the response 603B from the host 145 by injecting 630 a beacon into the host response 603B. In turn, the proxy 305 transmits the modified response 631 including the beacon to the client 605.

The injected beacon 630 may be a small pixel (e.g., 1×1) that the client will attempt to retrieve 635 by a beacon request 633. For example, the address of the beacon may be set as the address of the proxy 305 such that attempts to retrieve 635 the beacon (e.g., as an image) are directed to the proxy. Parameters of the beacon request 633 (e.g., a query string to retrieve the beacon) are set based on the client attributes and/or hash thereof and read 617 by the proxy 305 when the client 605 attempts to retrieve 625 the beacon. In turn, the proxy 305 determines the fingerprint 619 of the client from the client attributes read 617 from the parameters of the request.

Client Qualification

Figure 7:
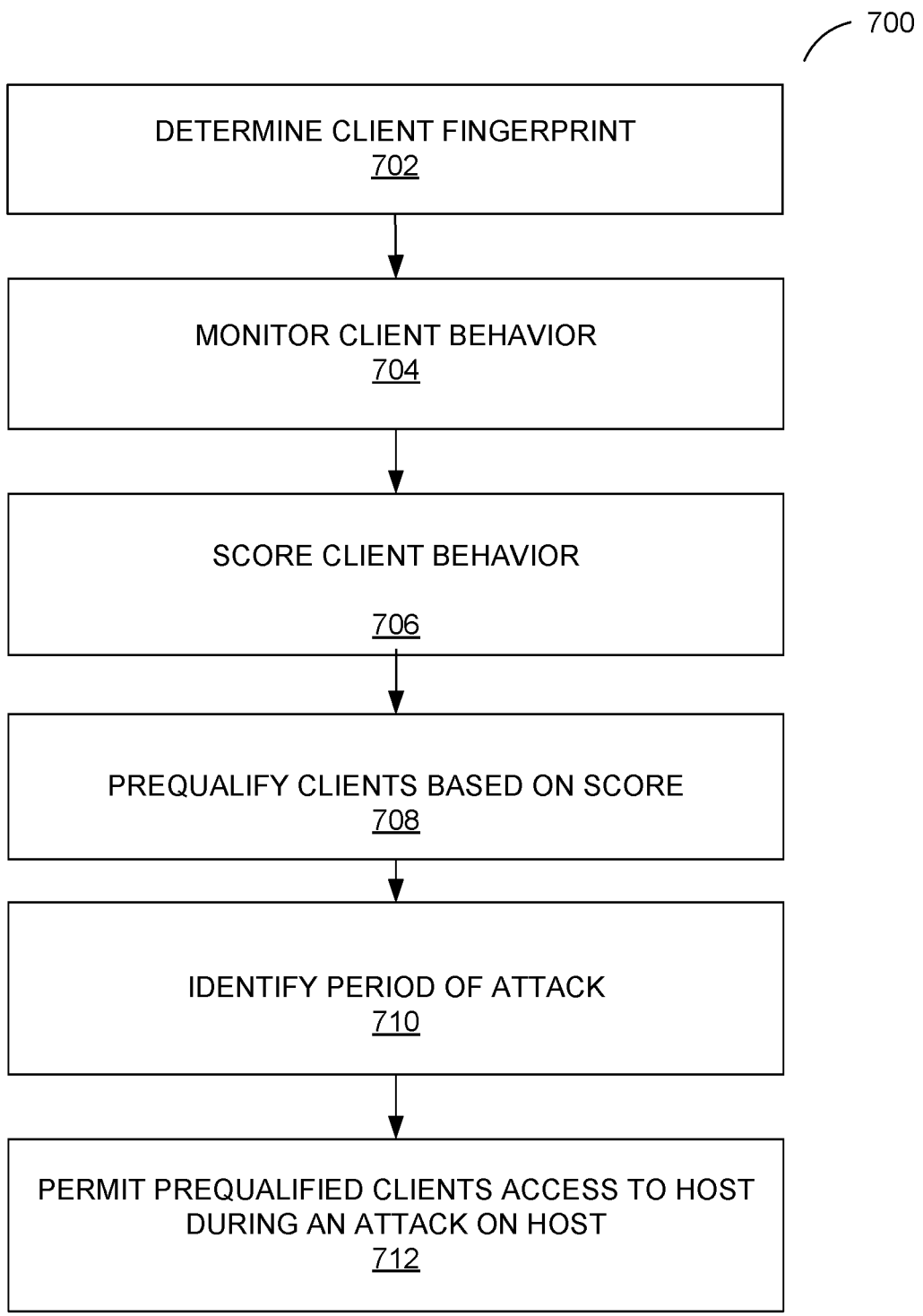
FIG. 7 illustrates an example flow chart for qualifying clients based on an analysis of client behavior and permitting prequalified clients access to a host during an attack period.

FIG. 7 illustrates an example flow chart 700 for qualifying clients based on an analysis of client behavior and permitting prequalified clients access to a host during an attack period, according to an embodiment. In one embodiment, a proxy (e.g., proxy 305), performs the operations described below.

Clients engage the host through the proxy to access application layer features and functionality of a host. As clients engage the host, the proxy determines a fingerprint 702 of each client engaging the host. The fingerprint determined 702 for a given client provides a relatively stable representation of the client such that the client may be distinguished from the other clients engaging the host.

The proxy monitors 704 the behavior of the clients engaging the host, such as by tracking the features and functionality of the host that a client engages. In one embodiment, the proxy tracks the URIs of user features and/or API functionality the client accesses at the host from requests associated with the client. The proxy continuously monitors 704 the behavior of the clients engaging the host during non-attack periods to build a store of client fingerprints corresponding to prequalified clients that exhibit non-malicious behavior (e.g., legitimate users).

The proxy scores 706 the behavior of clients and may prequalify 708 one or more clients based on their scores. In one embodiment, the proxy determines a score 706 for the behavior of a client based on scores associated with URIs and/or API functionality the client requests. In turn, the proxy may prequalify 708 the client based on the score. The proxy maintains a store of client fingerprints corresponding to the prequalified clients.

The proxy may identify 710 a period where the host is under attack. For example, the proxy may identify when an abnormal number of requests for features and functionality of the host are received from new and/or relatively unknown clients (e.g., clients for which a fingerprint has not been determined or are not prequalified). The proxy may deny these clients access to the features and functionality of the host and/or challenge these clients prior to passing client requests to the host. If the proxy identifies that a client engaging the host during the attack period is a prequalified client, based on the fingerprint of the client being maintained in a prequalified client store, the proxy permits the prequalified client access 712 to the host during the attack to maintain a high level of legitimate user experience. Accordingly, the proxy may deny non-prequalified clients access to the features and functionality of the host without significantly impacting legitimate user experience because prequalified clients are permitted access 712 to the features and functionality of the host during an attack.

Additional Configuration Considerations

Through use of a system, method, and computer readable storage medium storing computer program instructions for qualifying client behavior the effects of an attack on a host, such as an application layer (layer 7) DDoS attack can be mitigated. Thus, by implementing proxy servers similar to those described herein the security and resilience of hosts to DDoS attacks can be improved. Additionally, user experience is improved during attack periods through the prequalification of clients permitted to access host features and functionality.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms such as the fingerprinter, behavior analyzer, denied client store, prequalified client store, upstream mitigation interface, etc. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 402) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIG. 1, 2, or 3 or with FIGS. 5, 6A, 6B and FIG. 7) described herein may be performed, at least partially, by one or more processors (e.g., processor 402) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 404). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system, method, and computer readable storage medium storing computer program instructions for qualifying client behavior to mitigate the effects of an attack on a host, such as an application layer (layer 7) DDoS attack through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for prequalifying client access to a host during a distributed denial of service (DDoS) attack comprising:
   responsive to receiving an initial request by a client device for functionality from a host that is a server:
   routing the initial request to the host;
   receiving a response from the host;
   modifying the response to include code for determining a client fingerprint prior to transmission to the client device by injecting:
      a first executable code within the response configured to determine client attributes; and
      a second executable code within the response configured to provide the client attributes to a proxy server; and
   transmitting the modified response to the client device;
   determining, responsive to receiving the client attributes from the client device, a fingerprint for the client device based on the client attributes;
   monitoring behavior of the client device while the client device engages with the host by at least the initial request, wherein the monitoring includes tracking and identifying at least a sequence of uniform resource identifiers associated with the functionality requested by the client device from the host to determine a progression of the client device through the functionality requested by the client device from the host;
   determining that the client device is engaging in a qualified behavior based on at least the sequence of uniform resource identifiers associated with the functionality requested from the host;
   prequalifying, responsive to the client device engaging in the qualified behavior, the client device by at least storing the fingerprint for the client device in a prequalified client store;
   in response to identifying a DDoS attack occurring on the host and receiving a plurality of access requests from a plurality of client devices:
      (i) determining a client fingerprint from one or more devices from the plurality of client devices;
      (ii) determining whether each of the client fingerprints is maintained in the prequalified client store;
      (iii) permitting selected client devices access to the host during the DDoS attack in response to determining that the client fingerprints associated with the selected client devices are maintained in the prequalified client store; and
      (iv) in response to determining that the client fingerprints of one or more selected client devices associated with the plurality of access requests are not maintained in the prequalified client store:
         denying host access to the one or more selected client devices during the DDoS attack; or
         selecting a challenge for the one or more selected client devices prior to permitting access to the host.

2. The method of claim 1, wherein monitoring behavior of the client device based on the functionality of the host requested by the client device further comprises tracking the functionality of the host that the client device engages according to one or more application programming interface functionalities identified in at least the initial requests received form the client device;
   wherein monitoring the behavior of the client device occurs during a non-attack period and wherein determining that the client device is engaging in the qualified behavior further comprises:
   (i) generating a score for the behavior of the client device based on at least the uniform resource identifiers requested by the client device or the application programming interface functionalities identified, wherein the score indicates whether the client device engaged in the qualified behavior based on a threshold score; and
   (ii) storing the fingerprint determined for the client device in the prequalified client store that maintains fingerprints corresponding to prequalified client devices in response to the score satisfying the threshold score.

3. The method of claim 1, wherein prequalifying the client device to permit the client device access to the host during a DDoS attack comprises:
   monitoring the behavior of the client device during a non-attack period;
   scoring the behavior of the client device based on at least the uniform resource identifiers requested by the client device, the score indicating whether the client device engaged in the qualified behavior; and
   storing the fingerprint determined for the client device in the prequalified client store that maintains fingerprints corresponding to prequalified client devices.

4. The method of claim 1, further comprising:
   identifying requests associated with a prequalified client device based on the fingerprint determined for the client device being maintained in the prequalified client store; and
   routing the requests associated with the prequalified client device to the host server during the DDoS attack.

5. The method of claim 1, wherein the first executable code is configured to query the client device for one or more of browser and client runtime information when executed by the client device.

6. The method of claim 1, wherein the second executable code, when executed by the client device, is configured to set a cookie value with the client attributes, perform a call with the client attributes to the proxy, or set parameters of a beacon request with the client attributes.

7. A system for prequalifying client access to a host during a distributed denial of service attack comprising:
   a proxy server comprising a processor and a non-transitory computer readable storage medium storing computer program instructions that when executed by the processor cause the proxy server to:
   in response to receipt of an initial request by a client device for functionality from a host server:
   route the initial request to the host server;
   receive a response from the host server;
   modify the response to include code for determining a client fingerprint prior to transmission to the client device by injecting:
      a first executable code within the response configured to determine client attributes; and
      a second executable code within the response configured to provide the client attributes to the proxy server; and
   transmit the modified response to the client device;
   determine, responsive to receipt of the client attributes from the client device, a fingerprint for the client device based on the client attributes;
   monitor behavior of the client device while the client device engages with the host via at least the initial request, wherein the monitoring includes tracking and identifying at least a sequence of uniform resource identifiers associated with the functionality requested by the client device from the host server to determine a progression of the client device through the functionality requested by the client device from the host server;

determining that the client device is engaging in a qualified behavior based on at least the sequence of uniform resource identifiers associated with the functionality requested by the client device from the host server;

prequalify the client device, responsive to the client device engaging in the qualified behavior, by storing the fingerprint for the client device in a prequalified client store; and wherein the proxy server is further configured to identify a DDoS attack occurring on the host while receiving a plurality of access requests from a plurality of client devices, and in response thereto:
  (i) determine a client fingerprint from one or more devices from the plurality of client devices;
  (ii) determine whether each of the client fingerprints is maintained in the prequalified client store;
  (iii) permit selected client devices access to the host during the DDoS attack in response to determining that the client fingerprints associated with the selected client devices are maintained in the prequalified client store; and
  (iv) in response to determining that the client fingerprints of one or more selected client devices associated with the plurality of access requests are not maintained in the prequalified client store:
    denying host access to the one or more selected client devices during the DDoS attack; or
    selecting a challenge for the one or more selected client devices prior to permitting access to the host.

8. The system of claim 7, wherein monitoring behavior of the client device based on the functionality of the host requested by the client device further comprises tracking the functionality of the host that the client device engages according to one or more application programming interface functionalities identified in at least the initial requests received form the client device.

9. The system of claim 7, wherein prequalifying the client device to permit the client device access to the host during a DDoS attack comprises:
  monitoring the behavior of the client device during a non-attack period;
  scoring the behavior of the client device based on at least the uniform resource identifiers requested by the client device, the score indicating whether the client device engaged in the qualified behavior; and
  storing the fingerprint determined for the client device in the prequalified client store that maintains fingerprints corresponding to prequalified client devices.

10. The system of claim 7, wherein the proxy server is further configured to:
  identify requests associated with a prequalified client device based on the fingerprint determined for the client device being maintained in the prequalified client store; and
  route the requests associated with the prequalified client device to the host server during the DDoS attack.

11. The system of claim 7, wherein the first executable code is configured to query the client device for one or more of browser and client runtime information when executed by the client device.

12. The system of claim 7, wherein the second executable code is configured to, when executed by the client device, set a cookie value with the client attributes, perform a call with the client attributes to the proxy, or set parameters of a beacon request with the client attributes.

13. A non-transitory computer readable storage medium for prequalifying client access to a host during a distributed denial of service attack, the computer readable storage medium comprising stored computer program instructions that when executed by a processor cause the processor to:
  in response to receiving an initial request by a client device for functionality of a host that is a server:
  route the initial request to the host;
  receive a response from the host;
  modify the response to include code for determining a client fingerprint prior to transmission to the client device by injecting:
    a first executable code within the response configured to determine client attributes; and
    a second executable code within the response configured to provide the client attributes to the proxy; and
  transmit the modified response to the client device;
  determine, responsive to receiving the client attributes from the client device, a fingerprint for the client device based on the client attributes;
  monitor behavior of the client device while the client device engages with the host by at least the initial request, wherein the monitoring includes tracking and identifying at least a sequence of uniform resource identifiers associated with the functionality requested by the client device from the host to determine a progression of the client device through the functionality requested by the client device from the host;
  determining that the client device is engaging in a qualified behavior based on at least the sequence of uniform resource identifiers associated with the functionality requested by the client device from the host;
  prequalify, responsive to the client device engaging in the qualified behavior, the client device by storing the fingerprint for the client device in a prequalified client store; and
  wherein the processor is further configured to identify a DDoS attack occurring on the host while receiving a plurality of access requests from a plurality of client devices, and in response thereto:
    (i) determine a client fingerprint from one or more devices from the plurality of client devices;
    (ii) determine whether each of the client fingerprints is maintained in the prequalified client store;
    (iii) permit selected client devices access to the host during the DDoS attack in response to determining that the client fingerprints associated with the selected client devices are maintained in the prequalified client store; and
    (iv) in response to determining that the client fingerprints of one or more selected client devices associated with the plurality of access requests are not maintained in the prequalified client store:
      denying host access to the one or more selected client devices during the DDoS attack; or
      selecting a challenge for the one or more selected client devices prior to permitting access to the host.

14. The non-transitory computer readable storage medium of claim 13, wherein instruction to monitor behavior of the client device based on the functionality of the host requested by the client device further comprises instruction to track the functionality of the host that the client device engages according to one or more application programming interface functionalities identified in at least the initial requests received form the client device.

15. The non-transitory computer readable storage medium of claim 13, wherein the instructions to prequalify the client device to permit the client device access to the host during a DDoS attack comprises instructions that when executed causes the processor to:
monitor the behavior of the client device during a non-attack period;
score the behavior of the client device based on at least the uniform resource identifiers requested by the client device, the score indicating whether the client device engaged in the qualified behavior; and
store the fingerprint determined for the client device in the prequalified client store that maintains fingerprints corresponding to prequalified client devices.

16. The non-transitory computer readable storage medium of claim 13, further comprising instructions that when executed causes the processor to:
identify the DDoS attack on the host;
identify requests associated with a prequalified client device based on the fingerprint determined for the client device being maintained in the prequalified client store; and
route the requests associated with the prequalified client device to the host server during the DDoS attack.

17. The non-transitory computer readable storage medium of claim 13, wherein the first executable code is configured to query the client device for one or more of browser and client runtime information when executed by the client device.

18. The non-transitory computer readable storage medium of claim 13, wherein the second executable code is configured to, when executed by the client device, set a cookie value with the client attributes, perform a call with the client attributes to the proxy, or set parameters of a beacon request with the client attributes.

* * * * *